Figure 1:
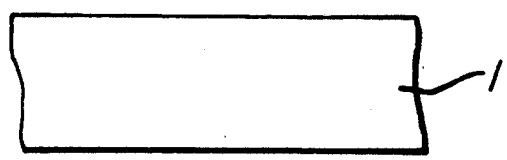

United States Patent [19]

Packham et al.

[11] Patent Number: 5,204,182

[45] Date of Patent: Apr. 20, 1993

[54] POLYOLEFIN FILM

[75] Inventors: Michael J. Packham, Shefford; Bernard C. Bushnell, Essex, both of England

[73] Assignee: Imperial Chemical Indusries PLC, London, England

[21] Appl. No.: 857,445

[22] Filed: Mar. 25, 1992

Related U.S. Application Data

[62] Division of Ser. No. 695,021, May 6, 1991, Pat. No. 5,116,926.

[30] Foreign Application Priority Data

May 4, 1990 [GB] United Kingdom ............... 9010092

[51] Int. Cl.$^5$ ................................. C09J 7/02
[52] U.S. Cl. ..................... 428/349; 428/355
[58] Field of Search .................. 428/349, 355; 526/348.1, 351

[56] References Cited

U.S. PATENT DOCUMENTS

| 4,168,361 | 9/1979 | Oda | 526/906 |
| 4,252,851 | 2/1981 | Lansburg | 526/348.6 |
| 4,554,321 | 11/1985 | Hwo | 526/348.6 |
| 4,569,983 | 2/1986 | Capaccio | 526/351 |
| 4,604,441 | 8/1986 | Ueeda | 526/351 |
| 4,727,112 | 2/1988 | Kohyama | 525/191 |
| 4,727,113 | 2/1988 | Kohyama | 525/191 |
| 4,965,319 | 10/1990 | Kawamoto | 525/194 |

*Primary Examiner*—Jenna L. Davis
*Attorney, Agent, or Firm*—Cushman, Darby & Cushman

[57] ABSTRACT

A polymeric film has a biaxially oriented substrate layer of a propylene polymer having an X-ray scattering phi ($\phi$) scan full width half maximum (FWHM) value greater than 16.0°. The film preferably comprises a polymeric heat-sealable layer on at least one surface of the substrate.

3 Claims, 1 Drawing Sheet

POLYOLEFIN FILM

This is a division of application Ser. No. 07/695,021, filed May 6, 1991 now U.S. Pat. No. 5,116,926.

This invention relates to a polyolefin film and, in particular, to a polyolefin film for packaging applications.

The packaging industry requires large quantities of film which protect a packaged product from the atmosphere and exhibit flavour barrier properties in order to maintain the freshness of the product. Polyolefins are in demand as film-forming materials by virtue of their strength and clarity but, in general, exhibit a tendency to deteriorate in appearance as a result of solvent absorption from the printing inks used on packaging materials. The aforementioned problem is particularly acute when polyolefin film is used as overwrap film for tobacco, especially in hot climates, where wrinkling of the polyolefin film frequently occurs. There is also a need to improve the flavour barrier properties of polyolefin films.

We have now devised a polyolefin film which overcomes or substantially eliminates at least one of the aforementioned problems.

Accordingly, the present invention provides a polymeric film comprising a biaxially oriented substrate layer of a propylene polymer, characterised in that the film has an X-ray scattering phi ($\phi$) scan full width half maximum (FWHM) value, as hereinafter defined, of greater than 16.0°.

The invention further provides a method of producing a polymeric film comprising a biaxially oriented substrate layer of a propylene polymer, characterised in that the film has an X-ray scattering phi ($\phi$) scan FWHM value, as hereinafter defined, of greater than 16.0°.

The invention still further provides a package comprising an article, such as a cigarette packet, wrapped in a film as hereinbefore defined.

A polymeric film as hereinbefore defined is "self-supporting" in the sense that it is capable of independent existence in the absence of a supporting base.

The propylene polymer forming the biaxially oriented substrate layer is suitably a propylene homopolymer or a propylene-olefin copolymer. In particular, the substrate for a packaging film conveniently comprises either a propylene homopolymer or a propylene-olefin block copolymer containing up to 15%, by weight of the copolymer, of at least one copolymerisable olefin- such as ethylene. A propylene homopolymer is especially preferred.

The X-ray scattering phi ($\phi$) scan full width half maximum (FWHM) values can be considered to be a measure of the out of plane disorientation of crystals i.e. crystal rocking. The details of the phi ($\phi$) scan testing procedure are described below. The phi ($\phi$) scan FWHM value is a measure of the variation of scattered intensity with $\phi$. A polymeric film of the invention preferably has an X-ray scattering phi ($\phi$) scan FWHM value in a range from 16.5° to 30.0°, more preferably from 17.0° to 23.0°, and particularly from 17.5° to 20.0°.

In a preferred embodiment of the invention, a polymeric film also has an X-ray scattering chi ($\chi$) scan MD/TD ratio of greater than 1.0. The X-ray scattering chi ($\chi$) scan MD/TD ratio can be considered to be a measure of in-plane crystal orientation, and is probably related to the degree of stiffness of crystal orientation. The details of the chi ($\chi$) scan testing procedure are given below. The MD/TD ratio is a ratio of the intensities with the MD (Machine Direction) and TD (Transverse Direction) parallel to the diffracting plane. A polymeric film of the invention preferably has an X-ray scattering chi ($\chi$) scan MD/TD ratio in a range from 1.0 to 2.0, more preferably from 1.1 to 1.5, and particularly from 1.15 to 1.3.

A polymeric film of the invention preferably has an X-ray scattering phi ($\phi$) scan FWHM value greater than 16.0° and an X-ray scattering chi ($\chi$) scan MD/TD ratio greater than 1.0, and more preferably a phi ($\phi$) scan FWHM value in a range from 17.5° to 20.0° and a chi ($\chi$) scan MD/TD ratio in a range from 1.15 to 1.3.

The substrate preferably additionally comprises a modulus improver.

By a modulus improver is meant a resin, of natural or synthetic origin, which is amorphous, hard, brittle and solid at ambient temperature, has a softening range at elevated temperature, has a drop softening point of at least 70° C., and is sufficiently compatible with the film forming propylene polymer to yield a composition from which may be formed a drawn, self-supporting transparent film exhibiting a modulus exceeding that of a film formed from an identical propylene polymer in the absence of the improver resin.

Suitable modulus improvers include naturally-occurring rosin acids, such as dihydroabietic acid, and derivatives of rosin formed, for example, by disproportionation at elevated temperatures or by hydrogenation at high pressures. Other suitable, commercially available, resins, include the IMPREZ aliphatic hydrocarbon resins derived by polymerisation of a petroleum residue containing a blend of $C_4$ and $C_5$ olefins, and supplied by Imperial Chemical Industries PLC; the ESCOREZ petroleum hydrocarbon resins supplied by Esso PLC; the ZONAREZ polyterpene resins supplied by the Arizona Chemical Company; the REGALYTE polyterpene resins supplied by Hercules; the ARKON polyterpene resins supplied by Arakawa; a completely saturated and aromatic vinyl toluene-alpha-methyl styrene copolymer—such as PICCOTEX; and a terpene resin derived from beta-pinene—such as PICCOLYTE, supplied by the Pennsylvania Industrial Chemical Company. Particularly useful modulus improvers are obtained by hydrogenation of a product formed by polymerising mixtures of unsaturated monomers from cracked petroleum—for example, by hydrogenation of an aliphatic PICCOPALE hydrocarbon resin supplied by the Pennsylvania Industrial Chemical Company. Preferred modulus improvers are polyterpene resins.

Desirably, the modulus improver is relatively free from olefinic unsaturation, and preferably exhibits an iodine value of less than 50.

To prevent leaching of the modulus improver from the film structure it is preferred that the modulus improver is of relatively high molecular weight (weight average)—for example, at least 500 and preferably of the order of 1000.

The modulus improver may be blended with the substrate-forming propylene polymer by conventional mixing techniques. For example, the modulus improver may be dry mixed with the propylene polymer in a simple tumble blender, or the components of the blend may be intimately mixed by melt extrusion, the components being, if desired, fed directly to the feed pocket of an extruder, and either directly extruded to form film or comminuted to particulate form suitable for subsequent re-extrusion.

The modulus improver is employed in an amount sufficient to confer the required improvement in film modulus without detriment to other desirable characteristics of the propylene polymer film—such as heat-seal strength. In practice, the modulus improver suitably constitutes from 1 to 50%, preferably from 2.5 to 35%, and particularly preferably from 5 to 20%, by weight of the blend (propylene polymer substrate and modulus improver).

A propylene polymer film generally exhibits relatively poor heat-sealing characteristics. Films of the present invention therefore preferably comprise an additional polymeric heat-sealable layer on at least one surface of the propylene polymer substrate layer. To be effective, this layer of heat-sealable material will melt at a temperature below that at which the propylene polymer begins to soften, and the heat-sealable layer must be sealable over a relatively wide temperature range. In addition, the heat-sealable layer must adhere securely to the propylene polymer substrate, and must be sealable to itself to provide a bond of adequate strength—usually referred to as the heat-seal strength. The heat-sealable layer preferably comprises an ethylene polymer.

An ethylene polymer suitable for use in forming the heat-sealable layer(s) of a film according to the invention comprises an ethylene homopolymer or a copolymer in which the ethylene content exceeds the total amount of other monomer(s) copolymerised therewith. A particularly suitable heat-sealable layer comprises a random copolymer of ethylene with at least one monoalphaolefin containing from 3 to 10 carbon atoms in its molecule.

By a random ethylene-monoalphaolefin copolymer is meant a copolymer comprising a polymer chain in which the ethylene and monoalphaolefin units are distributed in accordance with random statistics with no preference for long runs of one or other unit beyond that required to achieve the overall desired composition. Such copolymers are conveniently prepared by simultaneously feeding ethylene and at least one higher monoalphaolefin in the desired proportions to a catalysed polymerisation zone.

Suitable monoalphaolefin monomers for copolymerising with ethylene to form the random heat-sealable copolymer include propylene, pentene-1, hexene-1, heptene-1, octene-1 and decene-1, although butene-1 has proved to be a particularly suitable comonomer.

The monoalphaolefin content of the random copolymer, determined by peak height measurement of the infra-red spectrum of the copolymer, is desirably within a range of from 0.5 to 15, conveniently from 1 to 10, preferably from 2 to 7, and particularly preferably from 3 to 4, percent by weight of the copolymer.

An ethylene copolymer suitable for the formation of a heat-sealable surface layer on a substrate as hereinbefore defined preferably has a density not exceeding 0.950, and preferably in a range of from 0.910 to 0.950 gcm$^{-3}$ at 23° C. Selection of an ethylene copolymer having a density within the specified range is of importance in obtaining an improved degree of adhesion between the substrate and applied heat-sealable layer. The density of the ethylene copolymer is also of importance in achieving acceptable heat-sealing behaviour, i.e. suitably low threshold sealing temperature (e.g. 110° C.), acceptably wide sealing range (e.g. 110°-140° C.), and desirably high seal strength (e.g. 400-600 g/25 mm).

Preferably, therefore, the copolymer has a density (gcm$^{-3}$) at 23° C. of from about 0.910 to about 0.940, particularly preferably from about 0.930 to about 0.940.

The production of films having acceptable optical characteristics, e.g. haze, is assisted by selecting an ethylene copolymer having a melt flow index, measured in accordance with ASTM/D1238-65T (condition E), of from 5 to 10 g/10 minutes, and preferably of from 6 to 8 g/10 minutes. Suitable ethylene copolymers therefore exhibit a molecular weight (weight average) of from about 70,000 to about 55,000, and preferably from about 65,000 to about 57,000.

If desired, the optical characteristics of heat-sealable films of the invention may be further improved by restricting the choice of ethylene copolymer for the surface layer(s) to one having a relatively narrow molecular weight distribution—for example, Mw/Mn of from 3 to 5, wherein Mw and Mn are respectively the weight and number average molecular weights.

Formation of the various olefin homo- and co-polymers herein described as being suitable for use in heat-sealable films of the invention is conveniently effected in the presence of an organo-metallic catalyst, such as a transition metal compound with an organo-metallic activator. Particularly useful compounds of this type are titanium halide compounds activated with aluminium alkyl compounds. A preferred material is a titanium chloride.

Polymerisation of the olefin monomers may be effected in known manner—for example, in the presence or absence of an inert diluent, such as a suitably purified paraffinic hydrocarbon, in the liquid phase using an excess of liquid monomer as the polymerisation medium, or in the gas phase, the latter term being herein employed to indicate the essential absence of a liquid medium.

Application of the heat-sealable layer onto the substrate layer is conveniently effected by any of the laminating or coating techniques conventionally employed in the production of composite multi-layer films. Preferably, however, the heat-sealable layer is applied to the substrate by a coextrusion technique in which the polymeric components of the substrate and heat-sealable layers are coextruded into intimate contact while each is still molten. Preferably, the coextrusion is effected from a multi-channel annular die so designed that the molten polymeric components constituting individual layers of the composite film merge at their boundaries within the die to form a single composite structure which is then extruded from a common die orifice in the form of a tubular extrudate.

The polymeric film of the invention is oriented by stretching at a temperature above the glass transition temperature of the polymer(s). For example, orientation of a film having a propylene homopolymer substrate layer is conveniently effected at a temperature within a range of from about 145° to 165° C. Biaxial orientation is effected by stretching the film in each of two mutually perpendicular directions in the plane of the film. The biaxial orientation may be balanced or unbalanced, for example with the higher degree of orientation of an unbalanced film in a preferred direction—usually the transverse direction. A balanced biaxially oriented film is preferred. Conveniently, the polypropylene substrate material and the preferred heat-sealable layer material are coextruded in the form of a composite tube which is subsequently quenched, reheated, and then expanded by internal gas pressure to induce transverse orientation, and withdrawn, at a rate greater than that at which it is extruded, to stretch and orient it in the machine direction. Alternatively, a flat, multiple-layer film may be oriented by simultaneous or sequential stretching in each of two mutually perpendicular directions my means of a stenter, or by a combination of draw rolls and a stenter.

The degree to which the film substrate is stretched depends to some extent on the ultimate use for which the film is intended, but for a propylene polymer-based packaging film satisfactory tensile and other properties are generally developed when the film is stretched to between three and ten, preferably, five to seven, times its original dimensions in each of the transverse and longitudinal directions.

After stretching, the polymeric film may be thermally treated, for example, by a system of one or more heated rollers, as disclosed, for example, in GB-A-1124886. The aforementioned thermal treatment is preferably at a temperature in the range from 40° to 70° C. Alternatively, or additionally, the film may be subjected to a constrained heat treatment at a temperature in the range from 40° to 70° C., of the kind described in EP-A-23776.

Polymeric films in accordance with the invention may be prepared in a range of thicknesses governed primarily by the ultimate application for which a particular film is to be employed. Films, having a total thickness in a range extending from 2.5 to 100 μm are of general utility, but for packaging applications we prefer to employ a film of from about 10 to 50 μm in total thickness.

The ratio of substrate to heat-sealable layer thickness may vary within a wide range, although preferably the thickness of the heat-sealable layer should not be less than 0.2% (preferably 0.5%), nor greater than 50% of that of the substrate. In practice, the heat seal strength of a coated film according to the invention increases approximately in proportion to the thickness of the heat-sealable layer. To ensure an acceptably high value of heat seal strength, we prefer that the thickness of the heat-sealable layer should be at least 0.05 μm and preferably should not greatly exceed about 1.0 μm where shrinkage problems are likely to be encountered, a particularly suitable range of thickness being from 0.25 to 0.75 μm.

If desired, both of the substrate surfaces may be provided with a heat-sealable layer, preferably an ethylene polymer, and the thicknesses of the two heat-sealable layers may be the same or different. For example, a substrate film of 20.4 μm thickness is conveniently provided with a first ethylene polymer layer of 0.3 μm thickness on one surface and with a second ethylene polymer layer of 0.3 μm thickness on the other surface, the second ethylene polymer layer additionally comprising silicon dioxide filler and dimethyl siloxane. Alternatively, one surface of the substrate may be uncoated, or may be coated with a layer of a different composition depending on the properties required of the film for a particular application.

If desired, for example to improve print receptivity, a surface of a multiple-layer film according to the invention may be subjected to a chemical or physical surface-modifying treatment, a preferred treatment, because of its simplicity and effectiveness, being to subject the film surface to a high voltage electrical stress accompanied by corona discharge.

One or more of the layers of a polymeric film of the invention may conveniently contain any of the additives conventionally employed in the manufacture of thermoplastics films. Thus, additives such as dyes, pigments, lubricants, anti-static agents, anti-oxidants, surface-active agents, stiffening aids, slip aids, gloss-improvers, prodegradants, and ultra-violet light stabilisers may be employed. If desired, such additives—particularly an anti-static system, may be applied directly to a surface of the film, preferably prior to orientation—for example by a wash-coating technique.

The invention is illustrated by reference to the accompanying drawings in which:

FIG. 1 depicts a side elevation of a portion of a biaxially oriented propylene polymer film substrate 1.

Figure 2:
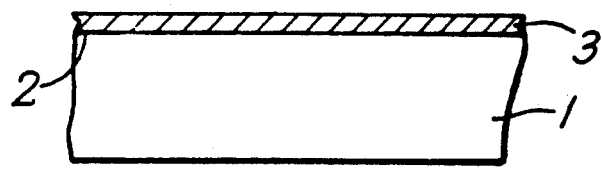

FIG. 2 depicts a side elevation of a similar film portion having, on a surface 2 of substrate 1, a heat-sealable layer 3 formed from an ethylene-butene-1 random copolymer.

Figure 3:
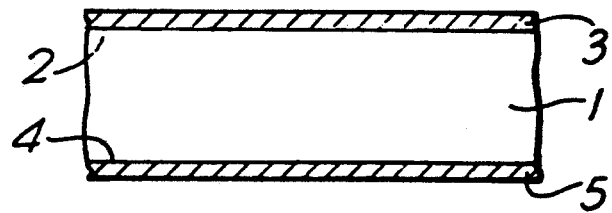

FIG. 3 depicts a side elevation of a similar film portion having, on a second surface 4 of substrate 1, a heat-sealable layer 5 formed from an ethylene-butene-1 random copolymer.

The following test methods were employed in assessing films according to the invention:

(a) Solvent vapour immersion test 3 samples of film (10×250 mm) were cut along the machine direction (MD) and 3 samples (10×250 mm) cut along the transverse direction (TD) of the film. Two gauge marks, 150 mm apart, were marked symmetrically about the middle of the length of each film sample. Toluene was added to a 200 mm diameter crystallising dish to a depth of about 2.4 cm. The film strips were positioned across the diameter of the dish in a radial array, with the ends of the strip stuck down with Sellotape adhesive tape to give about 0.5 cm of slack at the centre of the dish. The dish was covered with a glass plate and stood in a ventilated fume cupboard. The length of the film still immersed in vapour was measured directly through the glass plate, taking care fully to extend the swollen film without stretching it further. Readings were taken after 4 and 23 hours immersion in vapour. Mean values of the 3 film samples for the MD and TD were calculated.

(b) Wide-angle X-ray scattering measurement

Measurements were made using a Philips PW1050 Vertical Goniometer System with Cu K$\alpha$ radiation. The entrance and exit slits were 1/6° and 4° respectively. The angle between the entrance and exit slit is 2$\theta$, and the angle between the plane of the film and the normal to the diffracting plane of the goniometer is $\phi$.

(i) Phi ($\phi$) scans 1 mm wide strips of film were cut along the MD of the film and mounted in a diffractometer with their length along the goniometer axis and perpendicular to the beam direction. With 2$\theta$ equal to 16.6°, the intensity was measured for $\phi=90°\pm40°$. Background intensity was estimated by varying 2$\theta$ from 10° to 26°, with $\phi=90°$. Full width half maximum (FWHM) values of the variation of scattered intensity with $\phi$ were calculated.

(ii) Chi ($\chi$) scans

A circular sample of film of 35 mm diameter was used and was mounted in a device that enables the film sample to be rotated about an axis which is perpendicular to the speciment plane and which is held perpendicular to the axis of the goniometer. The scattered intensity was measured as the sample was rotated about an axis perpendicular to the specimen plane, when 2$\theta$ was equal to 13.7° and $\phi$ equal to 17.5°. Background intensity was estimated by varying $2\theta$ from 10° to 30°, with $\phi$ equal to 17.5° and interpolating between $2\theta=12°$ and 16°. The value of the background was then taken as the point on the interpolated line at $2\theta=13.7°$. The MD intensity was measured when the MD was parallel to the diffracting plane, and the TD intensity measured when the TD was parallel to the diffracting plane. The MD/TD ratio is the ratio of the two intensities after subtraction of the background value.

The invention is further illustrated by reference to the following Examples:

EXAMPLE 1

From a triple channel annular die were coextruded
(i) a core layer of propylene homopolymer comprising 12% by weight of a polyterpene resin,
(ii) an inner heat-sealable layer of an ethylene-butene-1 random copolymer containing 3% by weight of butene-1, and
(iii) an outer heat-sealable layer of the same copolymer as in layer (ii) above, additionally comprising 0.45% by weight of silicon dioxide of nominal particle size 2-4 μm (HP 25, supplied by Crossfield Silicas), and 0.4% by weight of dimethyl siloxane.

The 3-layer tube was cooled by passage over a mandrel within the tube, and externally quenched by passage through a water bath surrounding the mandrel, heated to stretching temperature, expanded by internal gas pressure, and withdrawn from the expansion zone at a rate greater than that at which it was fed thereto, so that the tube was stretched to six times its original dimensions in both the direction of extrusion and in a direction transverse thereto.

The stretched tubular film was then opened out to form a flat film which was subsequently passed over a matt-surfaced roller at a temperature of from 50° to 70° C., of the kind described in GB-A-1124886.

Discharge treatment of the inner heat-sealable layer (ii) surface of the film was effected by a single aluminum rod electrode extending across the entire width of the film, and connected to a Sherman GT60, 6 kilowatts, solid state corona treater, operating at 1.5 amps.

The thickness of the heat-sealable layer on each surface of the resultant film was 0.3 μm, the film having a total thickness of about 21 μm.

Films assessed in accordance with the aforementioned test procedures exhibited the following characteristics:

| (a) Solvent vapour immersion test | 4 hours | 23 hours |
| --- | --- | --- |
| MD | +0.85 | +0.72 |
| TD | +1.08 | +1.14 |

('+' is shrinkage, and '−' is expansion).

(b) Wide-angle X-ray scattering measurement
(i) Phi ($\phi$) scan
FWHM(°)=18.5°
(ii) Chi ($\chi$) scan
Intensity MD/TD=1.2

EXAMPLE 2

This is a comparative Example not according to the invention.

From a triple channel annular die were coextruded
(i) a core layer of propylene homopolymer comprising 12% by weight of a polyterpene resin,
(ii) an inner heat-sealable layer of an ethylene-butene-1 random copolymer containing 3% by weight of butene-1, and
(iii) an outer heat-sealable layer of the same copolymer as in layer (ii) above, additionally comprising 0.45% by weight of silicon dioxide of nominal particle size 2-4 μm (HP 25, supplied by Crossfield Silicas), and 0.4% by weight of dimethyl siloxane.

The 3-layer tube was cooled by passage over a mandrel within the tube, and externally quenched by passage through a water bath surrounding the mandrel, heated to stretching temperature, expanded by internal gas pressure, and withdrawn from the expansion zone at a rate greater than that at which it was fed thereto, so that the tube was stretched to six times its original dimensions in both the direction of extrusion and in a direction transverse thereto.

The stretched tubular film was then opened out to form a flat film which was subsequently passed over a matt-surfaced roller at a temperature of 115° C., of the kind described in GB-A-1124886.

Discharge treatment of the inner heat-sealable layer (ii) surface of the film was effected by a single aluminum rod electrode extending across the entire width of the film, and connected to a Sherman GT60, 6 kilowatts, solid state corona treater, operating at 1.5 amps.

The thickness of the heat-sealable layer on each surface of the resultant film was 0.3 μm, the film having a total thickness of about 21 μm.

Films assessed in accordance with the aforementioned test procedures exhibited the following characteristics:

| (a) Solvent vapour immersion test | 4 hours | 23 hours |
| --- | --- | --- |
| MD | −0.53 | −0.36 |
| TD | −0.27 | −0.93 |

('+' is shrinkage, and '−' is expansion).

(b) Wide-angle X-ray scattering measurement
(i) Phi ($\phi$) scan
FWHM(°)=16.0°
(ii) Chi ($\chi$) scan
Intensity MD/TD=1.0

EXAMPLE 3

Film produced in Example 1 was wrapped, using a Sasib CP1 Tobacco Pack Carton Overwrapper, around a range of cigarette cartons containing 20 kingsize cigarettes, manufactured by Rothmans International, Seita France, BAT Industries and Scandinavisk Tobac respectively. The cigarette cartons had been printed using solvent inks. The wrapped cigarette cartons were placed in 3 ovens set at 38° C., 50° C. and 70° C., and the wrapped cartons were aged for 16 hours, 1 hour and 3 minutes respectively. In all cases the aged film samples showed no sign of solvent attack.

EXAMPLE 4

This is a comparative example not according to the invention.

The procedure of Example 3 was repeated except that film produced in Example 2 was used instead of film produced in Example 1.

The aged film samples showed evidence of solvent attack, as illustrated by the presence of wrinkling of the film wrapped around the cigarette cartons.

EXAMPLE 5

Film produced in Example 1 was subjected to a flavour barrier test. Measurement of the steady state permeability of the film to menthol was made at 40° C. The vapour pressure of the menthol at source was $15.5 \times 10^{-3}$ cmHg, and the vapour pressure on the downstream side was effectively zero. The Permeability Coefficient of the film was $1.3 \pm 0.1 \times 10^{13}$ $gcm^{-2}sec^{-1}Hgcm^{-1}$.

EXAMPLE 6

This is a comparative example not according to the invention.

The procedure of Example 5 was repeated except that film produced in Example 2 was used instead of film produced in Example 1.

The Permeability Coefficient of the film was $2.2 \pm 0.2 \times 10^{13}$ $gcm^{-2}sec^{-1}Hgcm^{-1}$.

EXAMPLES 7 TO 9

These are comparative examples not according to the invention. A range of commercially available polymeric films having a substrate layer of a propylene polymer were subjected to wide-angle X-ray scattering measurement as described above. The results are given below.

| Film Sample | Phi ($\phi$) Scan (FWHM) | Chi ($\chi$) Scan (Intensity MD/TD) |
| --- | --- | --- |
| Walothen CT20 (Wolff Walstrode) | 9.1 | 0.2 |
| Bicor 20MD420 (Mobil) | 11.0 | 0.26 |
| BXT20 (Montedison Moplefan) | 13.3 | 0.8 |

The above films were evaluated using the test procedure described in Example 3. All the aged film samples showed evidence of solvent attack, as illustrated by the presence of wrinkling of the film wrapped around the cigarette cartons.

The above examples illustrate the improved properties of films of the present invention.

We claim:

1. A film comprising a biaxially oriented substrate layer of a propylene polymer, characterised in that the film has an X-ray scattering phi ($\phi$) scan full width half maximum (FWHM) value, of greater than 16.0° and a polymeric heat-sealable layer on at least one surface of the propylene polymer substrate layer.

2. A film according to claim 1 wherein the heat-sealable layer comprises a copolymer of ethylene with from 0.5 to 15%, by weight of the copolymer of an alphamonoolefin, the molecule of which contains from 3 to 10 carbon atoms.

3. A film according to claim 2 wherein the ethylene copolymer is an ethylene-butene-1 copolymer.

* * * * *